(12) United States Patent
Hsieh et al.

(10) Patent No.: US 11,763,748 B2
(45) Date of Patent: Sep. 19, 2023

(54) PIXEL-ADDRESSABLE DISPLAY HAVING CURVABLE AREA

(71) Applicant: Hewlett-Packard Development Company, L.P., Spring, TX (US)

(72) Inventors: Hsing-Hung Hsieh, Taipei (TW); Dehuei Chen, Taipei (TW); Ann Alejandro Villegas, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/762,106

(22) PCT Filed: Oct. 21, 2019

(86) PCT No.: PCT/US2019/057174
§ 371 (c)(1),
(2) Date: Mar. 21, 2022

(87) PCT Pub. No.: WO2021/080552
PCT Pub. Date: Apr. 29, 2021

(65) Prior Publication Data
US 2022/0351685 A1 Nov. 3, 2022

(51) Int. Cl.
*G09G 3/3258* (2016.01)
*G09G 3/00* (2006.01)
(Continued)

(52) U.S. Cl.
CPC ............. *G09G 3/3258* (2013.01); *G09G 3/03* (2020.08); *G06F 1/1652* (2013.01); *G09F 9/301* (2013.01); *G09G 3/3233* (2013.01); *G09G 2300/0452* (2013.01); *G09G 2300/0809* (2013.01); *G09G 2310/0262* (2013.01); *G09G 2310/08* (2013.01); *G09G 2320/0233* (2013.01); *G09G 2320/0626* (2013.01)

(58) Field of Classification Search
CPC ...... G09G 3/3258; G09G 3/03; G09G 3/3233; G09G 2300/0452; G09G 2300/0809; G09G 2310/0262; G09G 2310/08; G09G 2320/0233; G09G 2320/0626; G06F 1/1652; G09F 9/301
USPC .......................................................... 345/690
See application file for complete search history.

(56) References Cited

U.S. PATENT DOCUMENTS 8,723,763 B2 * 5/2014 Jeong .................. G09G 3/3233
345/82
9,047,819 B2   6/2015 Kim et al.
(Continued)

OTHER PUBLICATIONS

Ching-Lin Fan et al, "Improvement in Brightness Uniformity by Compensating for the Threshold Voltages of Both the Driving Thin-Film Transistor and the Organic Light-Emitting Diode for Active-Matrix Organic Light-Emitting Diode Displays", International Journal of Photoenergy , Jun. 24, 2014 , vol. 2014, Article ID 604986, 8 pages , Hindawi.

*Primary Examiner* — Tom V Sheng
(74) *Attorney, Agent, or Firm* — QUARLES & BRADY LLP (57) ABSTRACT

A control circuit of a pixel-addressable display corrects a brightness of a pixel element of a pixel circuit of the display based on a curvature of a curvable area of the display. The control circuit selectively applies data line voltages to the pixel circuit. The pixel circuit applies a driving voltage to the pixel element based on the data line voltages.

14 Claims, 5 Drawing Sheets

(51) Int. Cl.
    *G09F 9/30*         (2006.01)
    *G06F 1/16*         (2006.01)
    *G09G 3/3233*     (2016.01)

(56)           References Cited

U.S. PATENT DOCUMENTS

| | | | |
|---|---|---|---|
| 9,570,042 B2* | 2/2017 | Jeong | G09G 3/3233 |
| 2004/0100426 A1 | 5/2004 | Gaganam et al. | |
| 2015/0002531 A1* | 1/2015 | Park | G06F 1/1652 |
| | | | 345/589 |
| 2015/0301672 A1* | 10/2015 | Kim | G09G 3/035 |
| | | | 345/156 |
| 2016/0148554 A1* | 5/2016 | Lim | G09G 3/20 |
| | | | 345/694 |
| 2016/0335950 A1 | 11/2016 | Kang et al. | |
| 2017/0322449 A1* | 11/2017 | Irie | G09G 3/3648 |
| 2018/0075797 A1* | 3/2018 | Park | G09G 5/10 |
| 2020/0066219 A1* | 2/2020 | Hsu | G09G 3/3607 |
| 2020/0394972 A1* | 12/2020 | Huang | G09G 5/10 |
| 2021/0225225 A1* | 7/2021 | Yu | G09G 3/035 |
| 2022/0215808 A1* | 7/2022 | Huang | G09G 3/03 |
| 2022/0229466 A1* | 7/2022 | Yildiz | G09G 3/2092 |

* cited by examiner

PIXEL-ADDRESSABLE DISPLAY HAVING CURVABLE AREA

BACKGROUND

Electronic devices of myriad types, including computing devices like laptop and notebook computers, tablet computing devices, personal digital assistant (PDA) devices, and smartphones, commonly include displays, or can be connected to standalone display devices. Older cathode-ray tube (CRT) display technology has largely been supplanted by newer technologies that are usually more energy efficient, and which are significantly thinner and lighter in weight. Examples of such newer technologies include liquid crystal display (LCD), light-emitting diode (LED), and organic LED (OLED) technologies.

DETAILED DESCRIPTION

As noted in the background section, newer technologies such as liquid crystal display (LCD), light-emitting diode (LED), and organic LED (OLED) technologies, have largely supplanted older display technologies. Displays using such newer technologies may have pixel elements. For example, an LCD has LCD pixel elements, an LED display has LED pixel elements, an OLED display has OLED pixel elements, and so on. The pixel elements of such a display are individually addressable, such that the display can be referred to as a pixel-addressable display.

Initially, pixel-addressable displays were rigidly flat, with pixel elements mounted to rigid flat substrates. More recently, pixel-addressable displays have been developed with flexible substrates. At first, such displays were rigidly curved, with the flexible substrate attached to a rigid backing that was curved along either or both planar axes. More recently, such displays have been developed in which the flexible substrate is attached to a backing having a bendable hinge (or multiple bendable hinges). A user of a bendable or foldable display may therefore be able to use the display in a bent or folded configuration as well as in a flat configuration.

In a rigidly curved display, the entire display may be curved, such the display has no non-curved areas. In a bendable or foldable display, however, the display may be curved just at each hinge area, just when the display is bent or folded. By comparison, the non-hinge areas of the display remain flat even when the display is in a bent or folded configuration.

A driving voltage is applied to each pixel element of a display to cause the pixel element to emit, transmit, or reflect (i.e., display) its colored light with a brightness corresponding to the voltage. Pixel elements attached at curved areas of the substrate of a display may have increased or decreased brightness for the same driving voltage as compared to pixel elements attached to flat (i.e., non-curved) areas. For example, when an OLED display is bent outwards, the pixel elements mounted at the hinge area, which has a convex curvature, have greater efficiency and thus greater brightness than when the display is flat. When the OLED display is bent inwards, the pixel elements mounted at the hinge area, which has a concave curvature, have lesser efficiency and thus lesser brightness than when the display is flat.

Users of displays having curved areas therefore view less than optimally displayed images, regardless of whether the displays are rigidly curved, or are bendable or foldable and currently in a curved configuration. A rigidly curved display curved along the x-axis with decreasing radius from the center of the display will appear brighter towards the center and dimmer towards the left and right edges. Similarly, at each hinge area, a foldable or bendable display will appear brighter or dimmer when in a curved configuration, depending on whether the display is bent inwards or outwards at the hinge area.

Techniques described herein ameliorate these and other issues. A pixel-addressable display includes a substrate having a curvable area. The curvable area may be rigidly curvable, or may correspond to a hinge area that can be bent or unfolded in a flat configuration as well as in a bent or folded configuration with concave curvature and/or in a bent of folded configuration with convex curvature. The display includes pixel circuits mounted on the substrate, and which each have a pixel element.

The display includes a control circuit. For each pixel circuit mounted at the curvable area of the substrate, the control circuit corrects the brightness of the pixel circuit's pixel element based on the curvature of the curvable area at which the pixel circuit is mounted. Therefore, a user using the display views a more optimally displayed image. The control circuit ensures that the display's brightness at the curvable area is the same as what it would be if this curvable area were flat. In the context of an OLED display, for instance, the control circuit compensates for the increased efficiency of the pixel elements at curvable areas with convex curvature, and the decreased efficiency of the pixel elements at curvable areas with concave curvature.

Figure 1A:
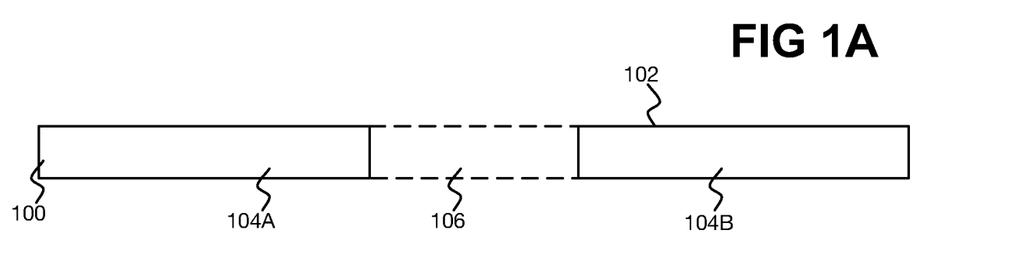
FIGS. 1A, 1B, and 1C are profile-view diagrams of an example pixel-addressable display having a curvable hinge area in respective flat, concave, and convex configurations.
Figure 1B:
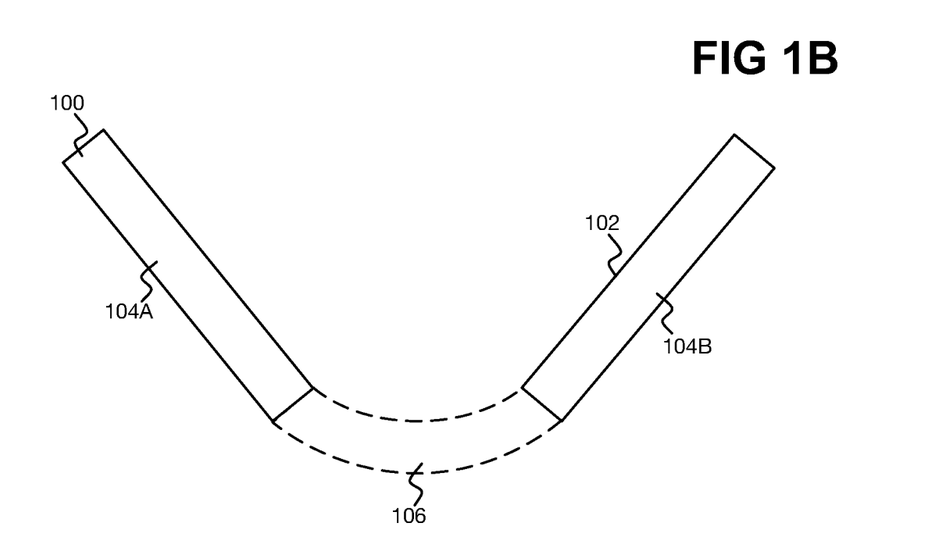
Figure 1C:
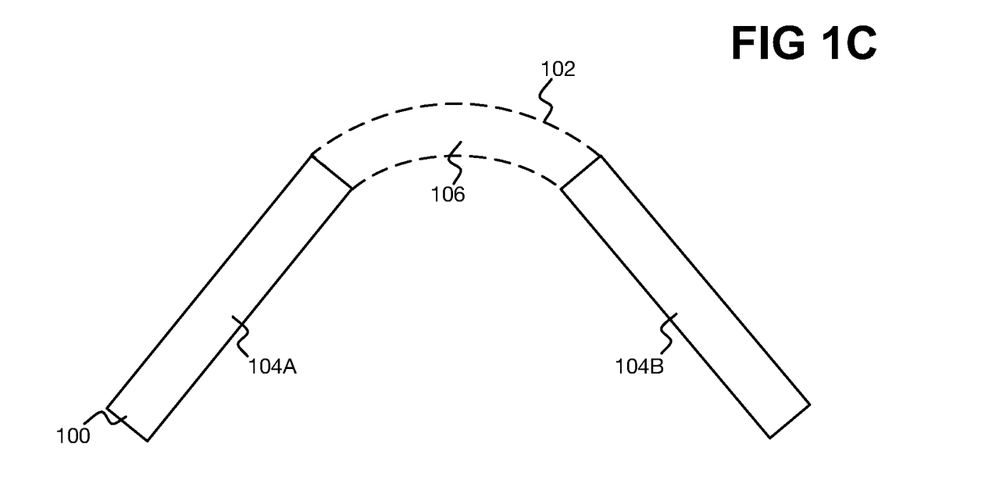

FIGS. 1A, 1B, and 1C show profile views of an example display 100 in flat, concave, and convex configurations, respectively. The display 100 has a display surface 102 at which images are displayed for viewing. The display 100 is curvable, meaning that the display 100 is capable of being curved. That the display 100 is curvable encompasses the display 100 being rigidly curved.

In the example of FIGS. 1A, 1B, and 1C, the display is bendable between the flat configuration of FIG. 1A to the concave configuration of FIG. 1B and the convex configuration of FIG. 1C. In another implementation, the display may be bendable between the flat configuration to just the concave configuration or just the convex configuration. The display 100 may in still another implementation be rigidly curved in the concave or convex configuration, and not bendable.

In the example of FIGS. 1A, 1B, and 1C, the display 100 has flat sections 104A and 104B, which are collectively referred to as flat sections 104, and a hinge section 106. The hinge section may be a dynamic fulcrum hinge in one implementation. In the flat configuration of FIG. 1A, the flat sections 104 and the hinge section 106 are flat. In the concave and convex configurations of FIGS. 1B and 1C, the flat sections 104 remain flat while the hinge section 106 is curved. In the concave configuration of FIG. 1B, the display 100 is bent or folded at the hinge area 106 inwards with respect to the display surface 102, which has a concave curvature at the hinge area 106. In the convex configuration of FIG. 1C, the display 100 is bent or folded at the hinge area 106 outwards with respect to the display surface 102, which has a convex curvature at the hinge area 106.

The display 100 may have a constant or decreasing radius of curvature across the hinge section 106 outwards from the center when in the concave and convex configurations of FIGS. 1B and 1C. In the example of FIGS. 1A, 1B, and 1C, the display 100 has one hinge section 106. However, in another implementation, there may be more than one hinge section 106. The multiple hinge sections 106 may be individually bent or folded. Each hinge section 106 can thus be flat or have a concave or convex curvature, regardless of whether the other hinge sections 106 are flat, have concave curvature, or have convex curvature.

In the example of FIGS. 1A, 1B, and 1C, the display 100 has two flat sections 104. However, in another implementation, there may be more than two flat sections 104 if there is more than one hinge section 106. Furthermore, in still another implementation, there may be no flat sections 104. The display 100 in such an implementation may be rigidly curved along the entirety of its display surface 102, with constant or decreasing radius of curvature from the center of the display 100 outwards towards its edges.

The display 100 has a different brightness at the hinge section 106 in the concave and convex configuration of FIGS. 1B and 1C as compared to the flat configuration of FIG. 1A. For example, if the display 100 is an OLED display, the display 100 has decreased efficiency and thus lesser brightness in the concave configuration of FIG. 1B as compared to in the flat configuration of FIG. 1A. If the radius of curvature of the hinge section 106 decreases outwards from the center, then the display 100 decreases in efficiency and brightness across the hinge section 106 with increasing distance from the center. If the radius of curvature is constant across the hinge section 106, then the display 100 has the same (reduced) efficiency and brightness across the hinge section 106.

Similarly, if the display 100 is an OLED display, the display 100 has increased efficiency and thus increased brightness in the convex configuration of FIG. 1C as compared to the flat configuration of FIG. 1A. If the radius of curvature of the hinge section 106 decreases outwards from the center, then the display 100 increases in efficiency and brightness across the hinge section 106 with increasing distance from the center. If the radius of curvature is constant across the hinge section 106, then the display 100 has the same (elevated) efficiency and brightness across the hinge section 106.

Figure 2:
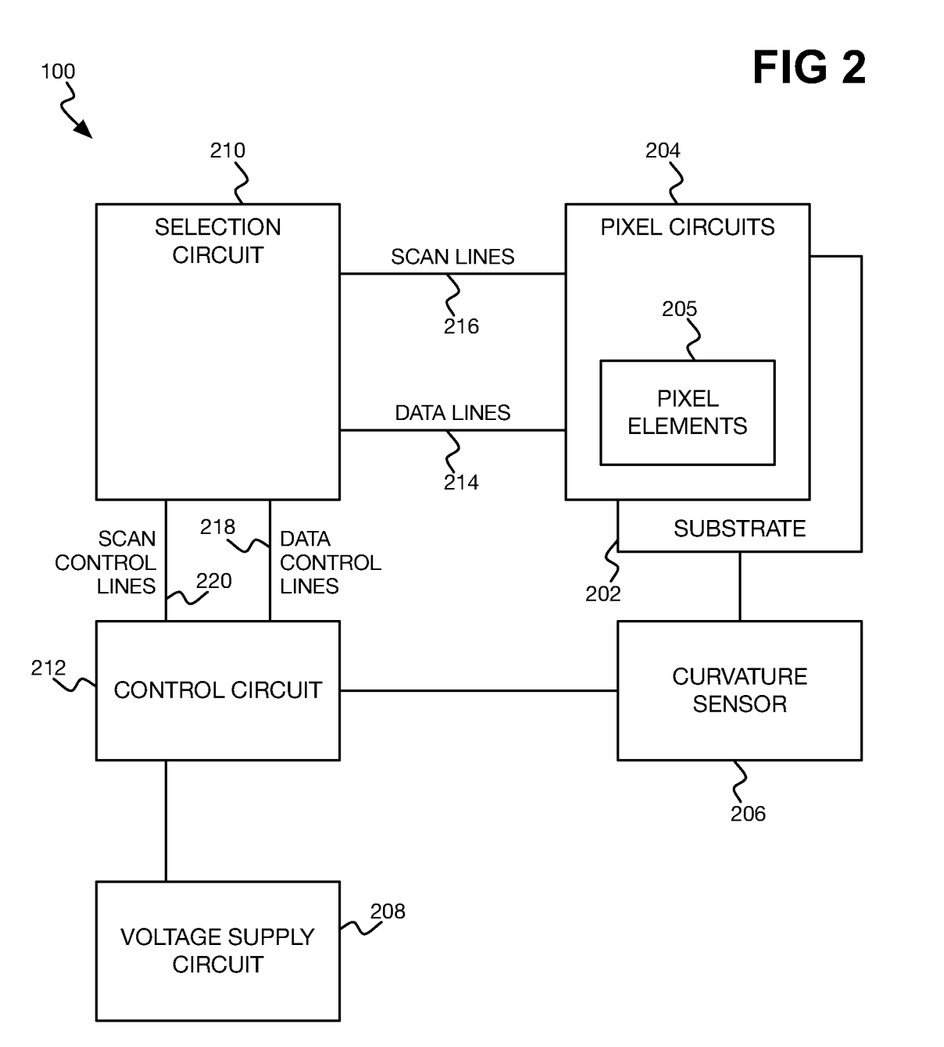
FIG. 2 is a block diagram of an example pixel-addressable display having a curvable area.

FIG. 2 shows a block diagram of the example display 100. The display 100 includes a flexible substrate 202 on which pixel circuits 204 are mounted. In the context of FIGS. 1A, 1B, and 1C, the flexible substrate 202 can extend across the flat sections 104 and the hinge section 106, with the pixel circuits 204 located at the display surface 102. The flexible substrate 202 thus has a curvable area corresponding to the hinge section 106 in this example.

The pixel circuits 204 have respective pixel elements 205, which are the elements of the circuits 204 that display an image. For example, for a full-color display, there may be red, green, and blue pixel elements 205 that respectively display (e.g., emit, transmit, or reflect) red, green, and blue light. A full-color pixel encompassing a set of red, green, and blue pixel elements 205 can be realized by suitably controlling the brightness of each of these pixel elements 205. The pixel elements 205 can be OLEDs, such that the display 100 is an OLED display.

The brightness of each pixel element 205 can depend on the driving voltage applied to the pixel element 205. The greater the driving voltage applied to a pixel element 205, the greater the brightness of light that the pixel element 205 displays. Similarly, the lesser the driving voltage applied to a pixel element 205, the lesser the brightness of light that the pixel element 205 displays. For a given type of pixel element 205, the relationship between driving voltage and brightness is known.

The display 100 can include a curvature sensor 206 if the display 100 is bendable or foldable. The sensor 206 detects the curvature of the substrate 202 at each point along its curvable area. Therefore, if the display 100 is rigidly curved instead of bendable or foldable, then the curvature of the substrate 202 over its curvable area may already be known and the display 100 may not include the sensor 206.

In the context of FIGS. 1A, 1B, and 1C, the sensor 206 may detect the angle between the flat sections 104. In the flat configuration of FIG. 1A, the angle is 180 degrees. In the concave configuration of FIG. 1B, the angle is less than 180 degrees. In the convex configuration of FIG. 1C, the angle is greater than 180 degrees.

In this implementation, the curvature at each point along the hinge section 106 may be determined in advance or otherwise is known for each possible angle between the flat sections 104. Therefore, by detecting the angle between the flat sections 104, the curvature sensor 206 is able to detect the curvature at each point along the hinge section 106, and thus at each point along the corresponding curvable area of the substrate 206. As noted above, the radius of curvature (and thus the curvature itself) may be constant or decrease with increasing distance from the center.

For example, in the flat configuration of FIG. 1A, the radius of curvature across the curvable hinge section 106 is zero. As the flat sections 104 are folded towards one per FIG. 1B or away from one another per FIG. 1C, the radius of curvature increases across the hinge section 106, starting at the center. As the flat sections 104 continue to be folded towards or away from one another, the portion of the hinge section 106 that is curved (i.e., that has a non-zero curvature radius) expands towards the edges of the hinge section 106 where the hinge section 106 meets the flat sections 104, until the entire hinge section 106 may be curved. The curvable (as opposed to the curved) area remains constant, because the hinge section 106 as a whole is capable of being curved regardless of whether any portion thereof is currently curved.

The display 100 can include a voltage supply circuit 208, a selection circuit 210, and a control circuit 212. The circuits 208, 210, and 212 can each be implemented in hardware, via electrical components like transistors, resistors, capacitors, and other types of electrical components. For instance, the circuits 208, 210, and 212 can be an application-specific integrated circuit (ASIC), a complex programmable logic device (CPLD), a field-programmable gate array (FPGA), and so on. In such an implementation, the circuits 208, 210, and 212 are thus not implemented in software like program code executable by a general-purpose processor.

The voltage supply circuit 208 provides a data line voltage between a specified minimum voltage and a specified maximum voltage. For example, the minimum voltage may be −5 volts and the maximum voltage may be +5 volts. The design and physical size of the voltage supply circuit 208 may dictate the maximum voltage that the voltage supply circuit 208 can provide. For example, without increasing size of the voltage supply circuit 208 or changing its design, the circuit 208 may not be able to provide a data line voltage greater than the specified maximum voltage.

The selection circuit 210 is connected to the pixel circuits 204 by data lines 214 and scan lines 216. Each pixel circuit 204 may be connected to a subset of the data lines 214 and a subset of the scan lines 216. The selection circuit 210 is connected to the control circuit 212 by data control lines 218 and scan control lines 220. The number of data control lines 218 is equal to the number of data lines 214 in the subset connected to each pixel circuit 204. The number of scan control lines 220 is likewise equal to the number of scan lines 216 in the subset connected to each pixel circuit 204.

The selection circuit 210 connects the control circuit 212 to the data lines 214 and the scan lines 216 for a pixel circuit 204 selected by the control circuit 212. That is, the selection circuit 210 connects the data control lines 218 of the control circuit 212 to respective data lines 214 connected to the selected pixel circuit 204. Likewise, the selection circuit 210 connects the scan control lines 220 of the control circuit 212 to respective scan lines 216 connected to the selected pixel circuit 204.

The control circuit 212 corrects the brightness of the pixel element 205 of the selected pixel circuit 204 based on the curvature of the curvable area of the substrate 202 at which the selected pixel circuit 204 is mounted. The control circuit 212 receives the curvature of the curvable area from the curvature sensor 206. For instance, in the context of FIGS. 1A, 1B, and 1C, the control circuit 212 may receive the angle between the flat sections 104, and may know the location of the selected pixel circuit 204 along the hinge section 106 relative to the center.

This angle and location information can dictate the radius of curvature of the hinge section 106 at which the selected pixel circuit 204 is mounted. Stated another way, the angle and location information can dictate the curvature of the curvable area of the substrate 202 at which this pixel circuit 204 is mounted. Because the location of the selected pixel circuit 204 along the hinge section 106 is fixed and the angle between the flat sections 104 is variable, the control circuit 210 is thus said to receive from the sensor 206 the curvature of the curvable area at which the selected pixel circuit 204 is mounted.

In general, the control circuit 212 may correct the brightness of the pixel element 205 of a selected pixel circuit 204 by increasing or decreasing the driving voltage applied to the selected pixel circuit 204 based on the curvature of the curved area of the substrate 202 at which the selected pixel circuit 204 is mounted. For example, for a pixel circuit 204 having an OLED pixel element 205, the control circuit 212 may increase the driving voltage applied to the pixel element 205 when the substrate 202 is bent inwards, as in the concave configuration of FIG. 1B. Similarly, the control circuit 212 may decrease the driving voltage applied to the pixel element 205 when the substrate 202 is bent outwards, as in the convex configuration of FIG. 1C.

As noted above, the driving voltage controls the brightness of the pixel element 205 of each pixel circuit 204. An OLED pixel element 205 has reduced efficiency and thus reduced brightness as concave curvature of the curvable area at which its pixel circuit 204 is mounted increases, and has increased efficiency and increased brightness as convex curvature of the curvable area increases. Therefore, the control circuit 212 increases driving voltage as concave curvature increases to compensate for the reduced efficiency of the OLED pixel element 205, and decreases driving voltage as convex curvature increases to compensated for the increased efficiency of the pixel element 205.

The driving voltage applied to a pixel element 205 is based on the data line voltages selectively applied to the subset of data lines 214 connected to the pixel circuit 204 including the pixel element 205 over data periods in which the subset of scan lines 216 connected to this pixel circuit 204 are selectively asserted. The control circuit 212 can thus vary the data line voltage provided by the voltage supply circuit 208, between the specified minimum and maximum voltage levels, and applied to each such data line 214 over the data periods, as the control circuit 212 selectively asserts the scan lines 216 connected to the pixel circuit 204. During a subsequent emission period, the control circuit 212 asserts a different scan line 216 connected to the pixel circuit 204 to apply the resulting driving voltage to the pixel element 205.

For a desired brightness of a pixel element 205, which is the brightness of the light that the pixel element 205 is to display for a given image, there is a corresponding driving voltage. In one implementation, the control circuit 212 may refer to a table to determine the data line voltages to be applied to the data lines 216 connected to the pixel circuit 204 to realize the driving voltage that results in the desired brightness, or may otherwise determine the data line voltages for the desired brightness. The control circuit 212 may refer to (another) table to determine the corrections to be made to the data line voltages to compensate for the curvature of the curvable area of the substrate 202 at which the pixel circuit 204 is mounted.

In another implementation, the control circuit 212 may refer to a table to determine the driving voltage that results in the desired brightness of the pixel element 205, or may otherwise determine the driving voltage for the desired brightness. The control circuit 212 may then refer to (another) table to determine the correction to be made to the driving voltage to compensate for the curvature of the curvable area of the substrate 202 at which the pixel circuit 204 is mounted. The control circuit may then refer to (another different) table to determine the data line voltages to be applied to the data lines 216 to realize the corrected driving voltage, or otherwise determine the data line voltages that realize the corrected driving voltage.

In still another implementation, the control circuit 212 may refer to a table to determine the data line voltages to be applied to the data lines 216 to realize a driving voltage that results in the desired brightness of the pixel element 205 at the curvature of the substrate 202 to which the pixel circuit 204 is mounted. In general, in each of these implementations, the control circuit 212 determines the data line voltages that yield a driving voltage for the desired brightness of the pixel element 205 at the curvature of the substrate 202 to which the pixel circuit 204 is mounted. The control circuit 212 may use tables, equations, and so on, to determine these data line voltages in various implementations.

The control circuit 212 selectively applies the determined data line voltages on the data control lines 218 over data periods while selectively asserting the scan control lines 220. Because the selection circuit 210 has respectively connected the data and scan control lines 218 and 220 to the data and scan lines 214 and 216 of the selected pixel circuit 204, the control circuit 212 in effect selectively applies the determined data line voltages on the data lines 214 while selectively asserting the scan lines 216. Application of the data line voltages on the data lines 214 over the data periods while the scan lines 216 are selectively asserted results in a driving voltage, which the selected pixel circuit 204 applies during an emission period following the data periods.

In this way, then, the control circuit 212 can correct the brightness of the pixel elements 205 of the pixel circuits 204 mounted at the curvable area of the substrate 202, by in effect applying driving voltages to such pixel elements 205 that compensate for their increased or decreased efficiency. Not all pixel circuits 204 may be mounted at a curvable area on the substrate 202, however. For example, in the context of FIGS. 1A, 1B, and 1C, the flat sections 104 are not curvable. The control circuit 212 does not correct the brightness of the pixel element 205 of each such pixel circuit 204 not mounted at a curvable area on the substrate 202. Rather, the control circuit 212 applies driving voltages to such pixel elements 205 corresponding to their desired brightness, without taking into account any such (non-existent) curvature.

Figure 3:
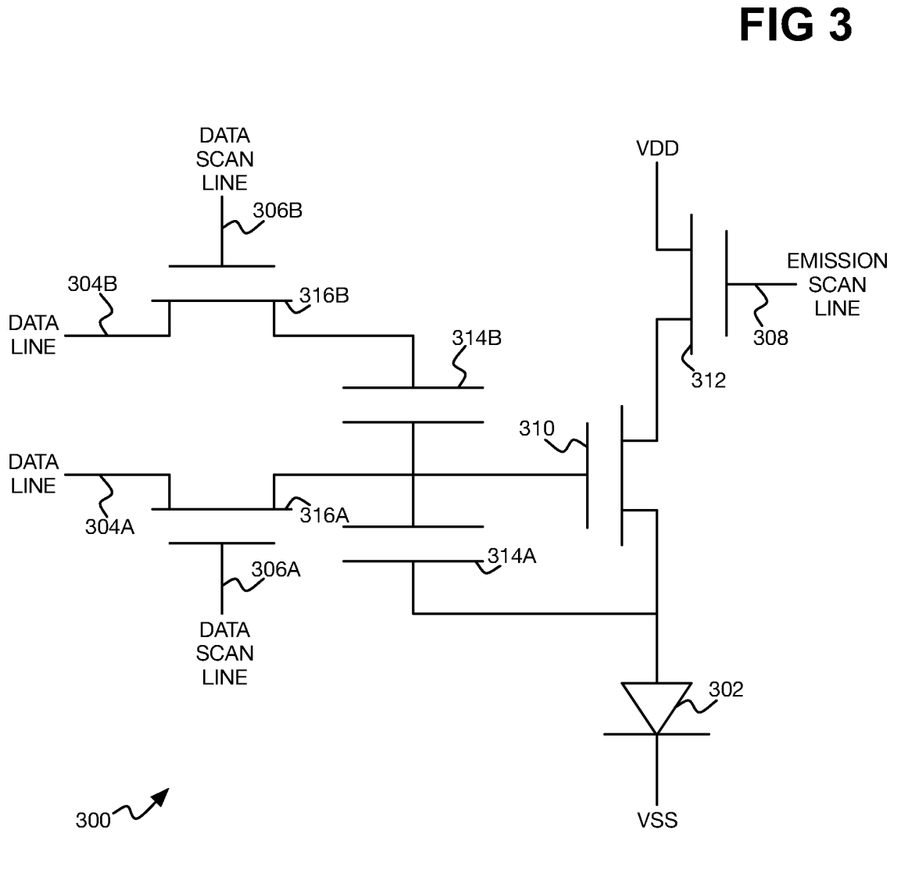
FIG. 3 is a diagram of an example pixel circuit for a pixel-addressable display.

FIG. 3 shows an example pixel circuit 300 for a pixel-addressable display. Each pixel circuit 204 of the display 100 of FIG. 2 may be implemented as the pixel circuit 300. The pixel circuit 300 includes a pixel element 302 connected to a low supply voltage VSS, which may be less than or equal to zero volts. The pixel element 302 emits, transmits, or reflects (i.e., displays) a given color of light at a brightness corresponding to the driving voltage applied to the element 302 within the pixel circuit 300. In the example of FIG. 3, the pixel element 302 is a diode, such as an OLED. Other examples of the pixel element 302 include LEDs, LCD elements, and so on.

The pixel circuit 300 includes data lines 304A and 304B, which are collectively referred to as the data lines 304. In the context of FIG. 2, the data lines 304 are the subset of data lines 214 connected to a selected pixel circuit 204. The pixel circuit 204 receives data line voltages at the data lines 304 between a minimum voltage and a maximum voltage over the data periods. In the context of FIG. 2, the control circuit 212 effectively applies the data line voltages. The maximum and minimum voltages that the pixel circuit 204 can receive at each data line 304 are the maximum and minimum data line voltages, respectively, that the voltage supply circuit 208 can provide.

The pixel circuit 300 includes data scan lines 306A and 306B, which are collectively referred to as the data scan lines 306, and an emission scan line 308. The data scan lines 306 correspond to the data lines 304. In the example of FIG. 3, each data line 304 has a corresponding data scan line 306. The data scan lines 306 are selectively asserted over the data periods. In the context of FIG. 2, the pixel circuit 204 selectively asserts the data scan lines 306 over the data periods. The emission scan line 308 is asserted during an emission period following the data line periods. In the context of FIG. 2, the pixel circuit 204 asserts the emission scan line 308 during the emission period.

In operation, the pixel circuit 300 receives the data line voltages at the data lines 304 as the data scan lines 306 are selectively asserted over the data periods. The data line voltage applied to each data line 304 during each data period, and the data scan line or lines 306 asserted during each data period, specify or dictate the driving voltage. The pixel circuit 300 applies the driving voltage to the pixel element 302 when the emission scan line 308 is asserted during the emission period.

In the example of FIG. 3, the maximum driving voltage that the pixel circuit 300 can apply to the pixel element 302 is greater than the maximum data line voltage that can be received at a data line 304. In the context of FIG. 2, this means that the maximum driving voltage is greater than the maximum data line voltage that the voltage supply circuit 208 can provide. Further in the example of FIG. 3, the minimum driving voltage that the pixel circuit 300 can apply to the pixel circuit 204 can be the minimum data line voltage that can be received at a data line 304. In the context of FIG. 2, this means that the minimum driving voltage is equal to the minimum data line voltage that the voltage supply circuit 208 can provide.

Permitting a maximum driving voltage greater than the maximum data line voltage can permit a pixel-addressable display to maintain a high uniform brightness as the display is bent from a non-folded or flat configuration to a folded or bent configuration. As an example, in the flat configuration of FIG. 1A, the display 100 may be set to a brightness corresponding to a driving voltage equal to the maximum data line voltage. If the display 100 is an OLED display, bending the display 100 to the concave configuration of FIG. 1B results in the display having reduced brightness at this voltage. That is, the display 100 is dimmer at the hinge section 106 than at the flat sections 104.

If the maximum driving voltage were equal to the maximum data line voltage that can be applied to a data line 304, then the control circuit 212 of FIG. 2 could not correct the brightness at the hinge section 106 to compensate for the reduced efficiency of the display 100 at this section 106, because the control circuit 212 would not be able to increase the driving voltage any further. The effective maximum driving voltage would therefore have to be set lower than the maximum data line voltage. That is, the maximum brightness to which a user could set the display 100 would have to correspond to a driving voltage less than the maximum data line voltage.

Setting the effective maximum driving voltage to less than the maximum data line voltage in this way therefore would thus permit the control circuit 212 of FIG. 2 to still increase the driving voltage for the hinge section 106 when the display 100 is in the concave configuration of FIG. 1B. The driving voltage for the hinge section 106 has to be increased so that the brightness at the hinge section 106 can be increased to match the brightness at the flat sections 104 of the display 100. Unlike at the hinge section 106, the display 100 does not operate at reduced efficiency at the flat sections 104 in the concave configuration. For a given driving voltage, the display 100 is brighter at the flat sections 104 than at the hinge section 106.

By comparison, the pixel circuit 300 permits the maximum driving voltage to exceed the maximum data line voltage that can be applied at a data line 304. This in turn allows for the control circuit 212 of FIG. 2 to correct the brightness at the hinge section 106 to compensate for the reduced efficiency of the display 100 at this section 106, even if the brightness at the flat sections 104 corresponds to a driving voltage equal to the maximum data line voltage. In this way, the pixel circuit 300 permits the display 100 to have a higher brightness regardless of whether the display 100 is in the flat, concave, or convex configuration of FIG. 1A, 1B, or 1C, for a given maximum data line voltage that the voltage supply circuit 208 of FIG. 2 can provide.

The pixel circuit 300 includes a driving transistor 310 connected to the pixel element 302 and that applies a driving voltage to the pixel element 302 corresponding to the gate voltage of the transistor 310. The actual voltage over the pixel element 302 is the driving voltage minus the gate threshold voltage of the driving transistor 310, minus the low supply voltage VSS. The pixel circuit 300 includes an emission scan line transistor 312 controlled by the emission scan line 308. The emission scan line transistor 312 is connected between a high supply voltage VDD, which may be greater than zero volts, and the driving transistor 310. When the emission scan line 308 is asserted, the emission scan line transistor 312 causes the driving transistor 310 to apply the driving voltage to the pixel element 302.

The pixel circuit 300 includes capacitors 314A and 314B, which are collectively referred to as the capacitors 314, and which correspond to the data lines 304. In the example of FIG. 3, each data line 304 has a corresponding capacitor 314. The capacitors 314 are both connected to the gate of the driving transistor 310. The capacitor 314A is also connected to the pixel element 302.

The pixel circuit 300 includes data scan line transistors 316A and 316B, which are collectively referred to as the data scan line transistors 316, and which correspond to and are controlled by the data scan lines 306. In the example of FIG. 3, each data scan line 306 has a corresponding data scan line transistor 316. The data scan line transistor 316A is connected between the data line 304A and the capacitor 314A, and the data scan line transistor 316B is connected between the data line 304B and the capacitor 314B. When a data scan line 306 is asserted, the corresponding data scan line transistor 316 causes the data line voltage at the corresponding data line 304 to be applied to the corresponding capacitor 314, and in the case of the transistor 316A, to both capacitors 314.

Figure 4:
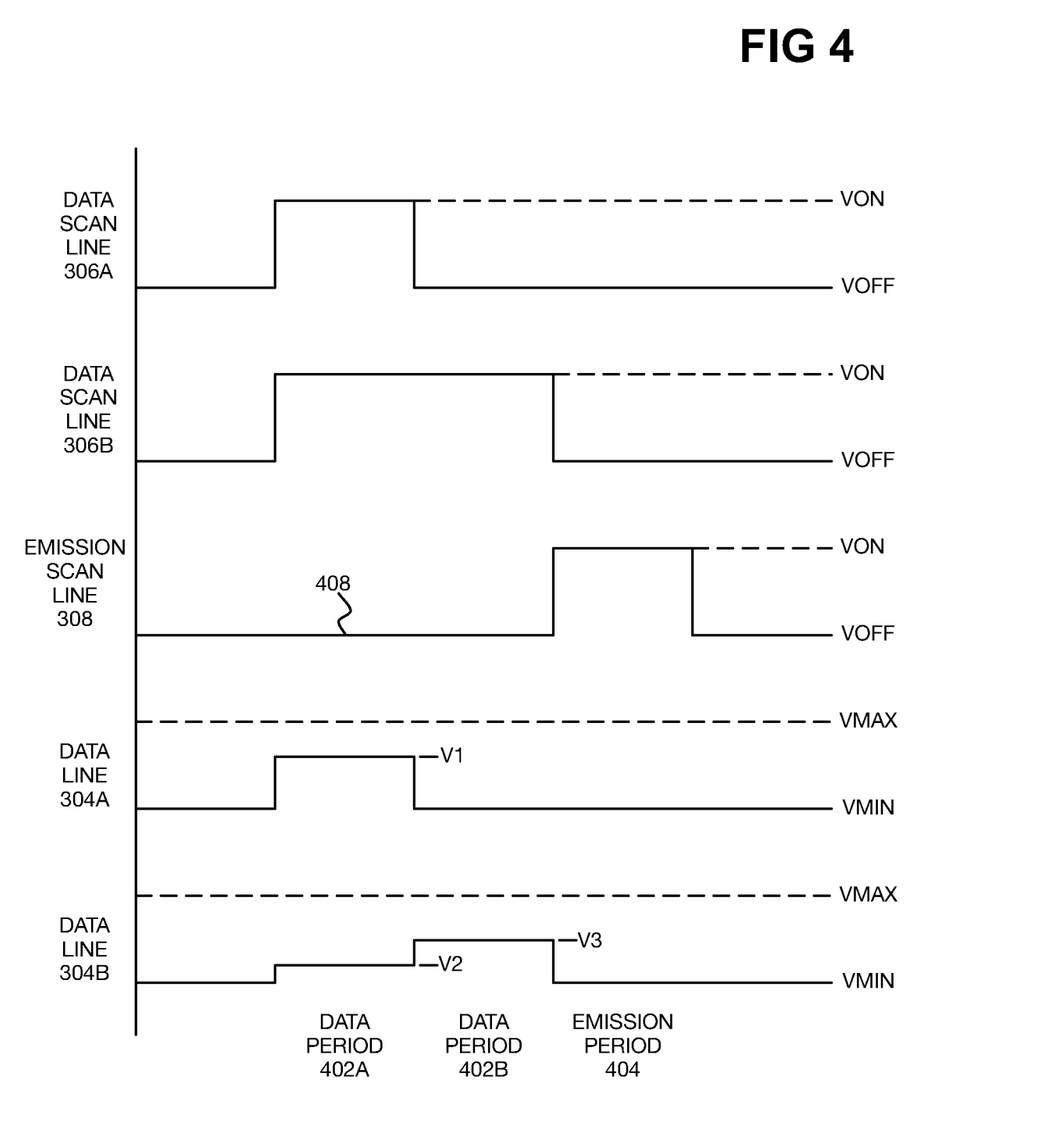
FIG. 4 is a timing diagram for the example pixel circuit of FIG. 3.

FIG. 4 shows a timing diagram of example operation of the pixel circuit 300. In the example operation, there are two consecutive data periods 402A and 402B, which are collectively referred to as the data periods 402, and an emission period 404. The driving voltage to be applied to the pixel element 302 is specified by selectively applying data line input voltages to the data lines 304 while selectively asserting the data scan lines 306 over the data periods 402. The specified driving voltage applied is applied to the pixel element 302 by asserting the emission scan line 308 in the emission period 404 following the last data period 402.

In the first data period 402A, the data scan lines 306 are both asserted by applying a high voltage VON, which turns on the data scan line transistors 316. A data line voltage V1 is applied to the data line 304A and a data line voltage V2 is applied to the data line 304B. In the example of FIG. 4, the data line voltages V1 and V2 are both between the minimum and maximum data line voltages VMIN and VMAX, which are respectively the minimum and maximum data line voltages that can be applied to a data line 304. The voltage at the ends of the capacitors 314 connected to the gate of the driving transistor 310 is thus V1. The voltage at the other end of the capacitor 314B is V2.

In the second data period 402B, the data scan line 306B remains asserted by continuing to apply the high voltage VON, whereas the data scan line 306A is deasserted by applying a low voltage VOFF. The data scan line transistor 316B accordingly remains on whereas the data scan line transistor 316A turns off. A data line voltage V3 is applied to the data line 304B. In the example of FIG. 4, the data line voltage V3 is greater than the data line voltage V2. The data line voltage applied to the data line 304A does not matter since the data scan line transistor 316S is now off, but in FIG. 4 is depicted as dropping to the minimum data line voltage VMIN. The voltage at the end of the capacitor 314B connected to the data scan line transistor 316B is thus V3.

Due to the coupling effect of the capacitors 314, the voltage at the gate of the transistor 310 is pulled up by V3−V2, which is the difference in voltage applied to the data line 304B at the data period 402B as compared to the data period 402. Because the voltage at the gate of the transistor 310 was at V1 at the end of the data period 402A, the voltage at the gate of the transistor 310 at the end of the data period 402A is V1+V3−V2. This voltage is the specified driving voltage.

A maximum driving voltage can be achieved by setting voltages V1 and V3 to VMAX and V2 to VMIN. The maximum driving voltage is thus 2*VMAX−VMIN. In this way, then, the pixel circuit 300 can provide a maximum driving voltage greater than the maximum data line voltage VMAX that may be able to be applied to a data line 304. In the context of FIG. 2, this means that the pixel circuit 300 can drive the pixel element 302 with a driving voltage greater than VMAX without having to modify the voltage supply circuit 208 to increase the maximum data line voltage VMAX.

In the emission period 404, the emission scan line 308 is asserted by applying the high voltage VON, while the data scan line 306B is deasserted and the data scan line 306A remains deasserted by applying the low voltage OFF. The emission scan line transistor 312 accordingly turns on while the data scan line transistor 316A remains off and the data scan line transistor 316B turns off. Turning on the emission scan line transistor 312 results in the driving transistor 310 applying the specified driving voltage to the pixel element 302.

Figure 5:
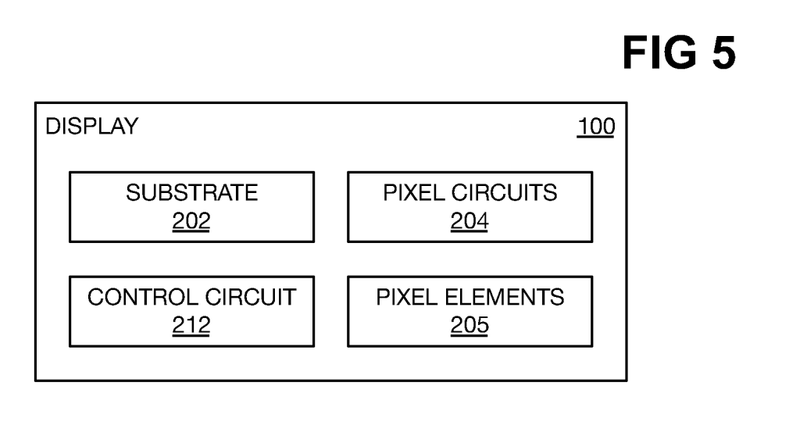
FIG. 5 is a diagram of an example pixel-addressable display.

FIG. 5 shows a block diagram of the example pixel-addressable display 100. The display 100 includes the substrate having a curvable area. The display 100 includes the pixel circuits 204 with pixel elements 205. The display 100 includes the control circuit 212. For each pixel circuit 204 mounted at the curvable area, the control circuit 212 corrects a brightness of the pixel element 205 of the pixel circuit 204 based on a curvature of the curvable area at which the pixel circuit 204 is mounted.

Figure 6:
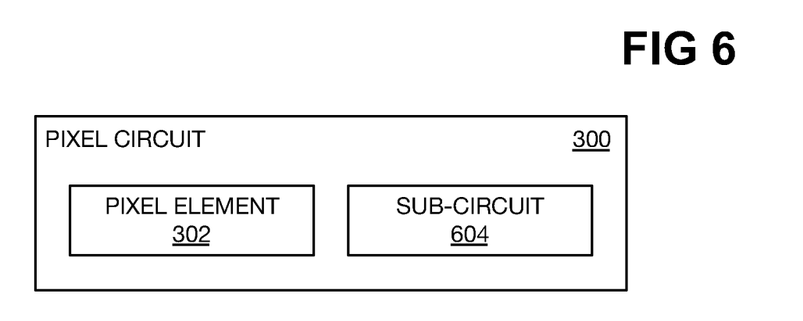
FIG. 6 is a diagram of an example pixel circuit for a pixel-addressable display.

FIG. 6 shows a block diagram of the example pixel circuit 300 for a pixel-addressable display. The pixel circuit 300 includes the pixel element 302 and a sub-circuit 604. The sub-circuit 604 may include the data lines 304, the data scan lines 306, the emission scan line 308, the transistors 310, 312 and 316, and the capacitors 314 of FIG. 3 in one implementation. The sub-circuit 604 is to receive data line voltages between a first minimum voltage and a first maximum voltage, and to apply a driving voltage to the pixel element 302 between a second minimum voltage and a second maximum voltage greater than the first maximum voltage.

Figure 7:
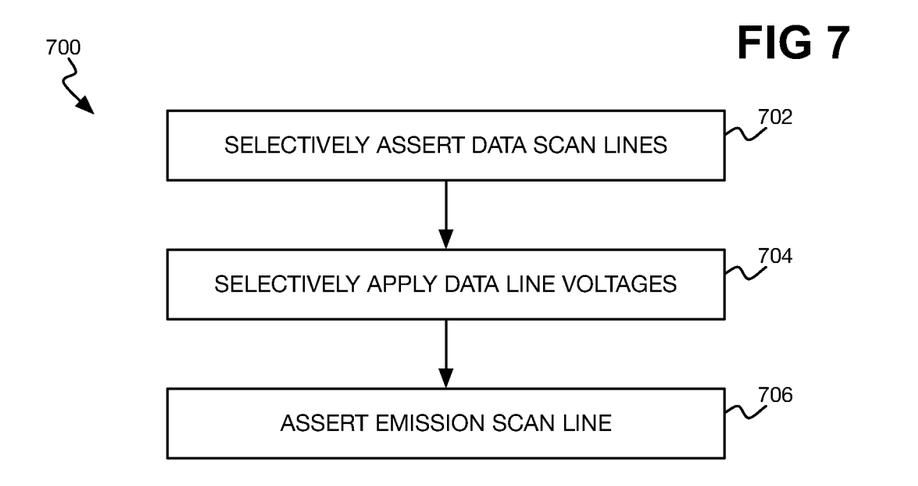
FIG. 7 is a flowchart of an example method for using a pixel circuit of a pixel-addressable display.

FIG. 7 shows an example method 700. The method 700 includes selectively asserting, by a control circuit of a pixel-addressable display, data scan lines of a pixel circuit of the display mounted at a curvable area of the display, during each of a number of data periods (702). The method 700 includes selectively applying, by the control circuit, data line voltages to data lines of the pixel circuit, during each data period (704). The data line voltages are based on a curvature of the curvable area. The method 700 includes asserting, by the control circuit, an emission scan line of the pixel circuit to apply a driving voltage to a pixel element of the pixel circuit, during an emission period following the data line periods (706). The driving voltage is based on the data line voltages.

Techniques have been described for maintaining a uniform brightness across a display even when the display is bent or folded. Specifically, the techniques can compensate for changes in brightness at curvable areas of the display when the display is bent or folded. A pixel circuit has been described that can apply a driving voltage to a pixel element of the circuit that is greater than the maximum data line input voltage that may be applied to data lines of the pixel circuit. The pixel circuit can be used with rigidly flat displays as well as curvable displays.

We claim:

1. A pixel-addressable display comprising:
   a substrate having a curvable area;
   a plurality of pixel circuits mounted on the substrate;
   a control circuit to correct, for ones of the pixel circuits mounted at the curvable area, brightness of a pixel element for the ones of the pixel circuits based on a curvature of the curvable area at which the ones of the pixel circuits are mounted; and
   a voltage supply circuit to supply a data line voltage between a first minimum voltage and a first maximum voltage,
   wherein the ones of the pixel circuits comprise a sub-circuit to:
      receive the data line voltage from the voltage-driving circuit, and
      apply, to the pixel element for the ones of the pixel circuits, a driving voltage between a second minimum voltage and a second maximum voltage greater than the first maximum voltage.

2. The pixel-addressable display of claim 1, wherein, for the ones of the pixel circuits mounted at the curvable area, the control circuit is to correct the brightness of the pixel element of the pixel circuit by increasing a driving voltage applied to the pixel element in correspondence with the curvature of the curvable area at which the pixel circuit is mounted, when the substrate is bent inward.

3. The pixel-addressable display of claim 2, wherein, for the ones of the pixel circuits mounted at the curvable area, the driving voltage corresponds to a desired brightness of the pixel element of the pixel circuit, the control circuit increasing the driving voltage to compensate for a decreased efficiency of the pixel element when the substrate is bent inward.

4. The pixel-addressable display of claim 1, wherein, for the ones of the pixel circuits mounted at the curvable area, the control circuit is to correct the brightness of a pixel element for the ones of the pixel circuits by decreasing a driving voltage applied to the pixel element for the ones of the pixel circuits in correspondence with the curvature of the curvable area at which the ones the pixel circuit is mounted, when the substrate is bent outward.

5. The pixel-addressable display of claim 4, wherein, for the ones of the pixel circuits mounted at the curvable area, the driving voltage corresponds to a desired brightness of the pixel element for the ones of the pixel circuits, the control circuit decreasing the driving voltage to compensate for an increased efficiency of the pixel element when the substrate is bent outward.

6. The pixel-addressable display of claim 1, wherein the control circuit is to:
   not correct, for the pixel circuits not mounted at the curvable area, to a brightness of a pixel element of the pixel circuits not mounted at the curvable area, and
   apply a driving voltage to the ones of the pixel circuits corresponding to a desired brightness of the pixel element.

7. The pixel-addressable display of claim 1, further comprising:
   a sensor to detect the curvature of the curvable area at which each pixel circuit is mounted;
   a plurality of data lines for the ones of the pixel circuits;
   a plurality of scan lines for the ones of the pixel circuits; and
   a selection circuit to connect the control circuit to the data lines and the scan lines for a selected one of the pixel circuits.

8. The pixel-addressable display of claim 1, wherein the pixel element of the ones of the pixel circuits comprise an organic-light emitting diode (OLED), and the pixel-addressable display is an OLED display.

9. A pixel circuit for a pixel-addressable display, comprising:
   a pixel element; and
   a sub-circuit to receive a plurality of data line voltages between a first minimum voltage and a first maximum voltage, and to apply a driving voltage to the pixel element between a second minimum voltage and a second maximum voltage greater than the first maximum voltage.

10. The pixel circuit of claim 9, wherein the sub-circuit comprises:
    a plurality of data lines to receive the data line voltages over a plurality of data periods;
    a plurality of data scan lines corresponding to the data lines that are selectively asserted over the data periods to specify the driving voltage based on the data line voltages received at the data lines over the data periods; and
    an emission scan line that is asserted during an emission period following the data line periods to apply the driving voltage to the pixel element.

11. The pixel circuit of claim 10, wherein the sub-circuit further comprises:
    a driving transistor connected to the pixel element and to apply the driving voltage to the pixel element;
    a plurality of capacitors corresponding to the data lines and connected to the driving transistor;
    a plurality of data scan line transistors, each data scan line transistor controlled by a corresponding data scan line and connecting a corresponding data line to a corresponding capacitor; and
    an emission scan line transistor controlled by the emission scan line and connected to the driving transistor.

12. A method comprising:
    selectively asserting, by a control circuit of a pixel-addressable display, a plurality of data scan lines of a pixel circuit of the display mounted at a curvable area of the display, during each of a plurality of data periods;
    selectively applying, by the control circuit, a plurality of data line voltages to a plurality of data lines of the pixel circuit, during each data period, the data line voltages based on a curvature of the curvable area; and
    asserting, by the control circuit, an emission scan line of the pixel circuit to apply a driving voltage to a pixel element of the pixel circuit, during an emission period following the data line periods, the driving voltage based on the data line voltages.

13. The method of claim 12, wherein selectively asserting the data scan lines during each data period comprises asserting a first data scan line and a second data scan line of the pixel circuit during a first data period, and asserting the second data scan line but not the first data scan line during a second data period,
    and wherein selectively applying the data line voltages during each data period comprises asserting a first data line voltage to a first data line of the pixel circuit and a second data line voltage to a second data line of the pixel circuit during the first data period, and asserting a third data line voltage to the second data line during the second data period.

14. The method of claim 13, wherein the driving voltage is based on the first voltage plus the third voltage minus the second voltage.

* * * * *